United States Patent [19]

Shigematsu et al.

[11] Patent Number: 4,848,872
[45] Date of Patent: Jul. 18, 1989

[54] OPTICAL FIBER CORE COLLATOR

[75] Inventors: Masayuki Shigematsu, Yokohama; Masahiko Fukuda, Tokyo, both of Japan

[73] Assignees: Sumitomo Electric Industries, Inc., Osaka; Ando Electric Co., Ltd., Tokyo, both of Japan

[21] Appl. No.: 217,998

[22] Filed: Jul. 12, 1988

[30] Foreign Application Priority Data

Jul. 31, 1987 [JP] Japan .................................. 62-192102

[51] Int. Cl.[4] .............................................. G02B 6/26
[52] U.S. Cl. ................................ 350/96.29; 350/96.15
[58] Field of Search ................ 350/96.15, 96.21, 96.29

[56] References Cited

U.S. PATENT DOCUMENTS 4,765,704 8/1988 Pers .................................... 350/96.15

Primary Examiner—John D. Lee
Assistant Examiner—Phan T. Heartney
Attorney, Agent, or Firm—Panitch, Schwartze, Jacobs and Nadel

[57] ABSTRACT

An optical core collator is disclosed wherein a light is modulated at a near end portion of an optical fiber by repeating applying a bending to and removing the applied bending from said optical fiber with a mechanical means, and the thus modulated light is detected with a photosensor at a far end portion of said optical fiber while applying a bending to said optical fiber with another mechanical means, thereby the cores of said optical fiber can be collated.

2 Claims, 1 Drawing Sheet

F I G. 1
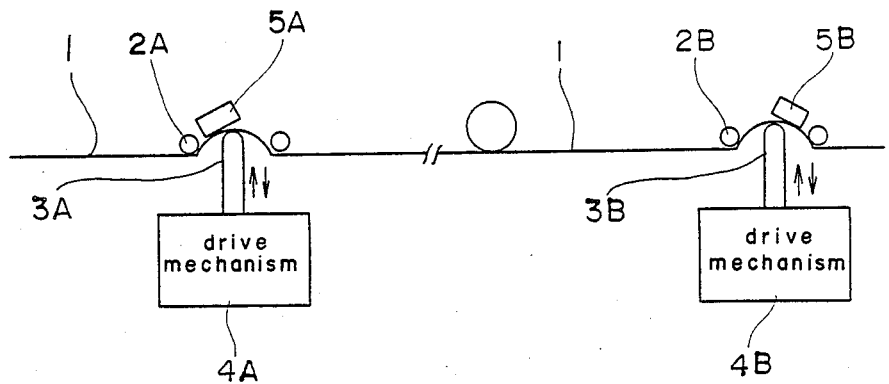

OPTICAL FIBER CORE COLLATOR

TECHNICAL FIELD OF THE INVENTION

The present invention relates to an optical fiber core collator which gives a light-modulated optical signal at the near end of an optical fiber with a mechanical means of repeating applying a bending to and removing the applied bending from said optical fiber, and detects said optical signal at the far end of said optical fiber while applying a bending to said optical fiber.

DESCRIPTION OF THE PRIOR ART

First of all, a schematic diagram of the prior art is shown in FIG. 2.

In FIG. 2, 11 is a signal source, 12 is a light source, 13 is an optical fiber, 14 is a photosensor and 15 is a filter.

IN FIG. 2, optical signals from the light source 12 are continously switched with a frequency f of the signal source 11, and said switched optical signals enter the optical fiber 13. The light exited from the optical fiber 13 is detected with the photosensor 14, and the frequency f is reproduced by the filter 15.

The cores of the optical fiber can be collated with a configuration such as FIG. 2. It is to be noted that the configuration of FIG. 2 was described in Japanese Patent Kokai Publication No. 61-109008.

Although the cores of the optical fiber can be collated with the configuration of FIG. 2, there is a problem that with the configuration of FIG. 2, the core collation cannot be performed for an optical fiber in the course of communication since the optical fiber should be cut each time the core collation is performed.

SUMMARY OF THE INVENTION

It is an object of the present invention to provide a core collator performing the core collation of an optical fiber by giving a modulation to optical signals proceeding within the optical fiber with a mechanical means of repeating bending of the optical fiber by forcibly applying an external force at the near end of the optical fiber and removing thus applied bending, as well as by providing a mechanical means at the far end of the optical fiber which is the same as the one provided at the near end of the optical fiber, disposing a detector near the optical fiber in which a bending has been applied and thereby demodulating the modulated light. The present invention is based on the property that optical signals proceeding within an optical fiber attenuate when the optical fiber is bent.

BRIEF DESCRIPTION OF THE DRAWINGS

FIG. 1 is a schematic diagram of an embodiment according to the present invention.

Figure 2:
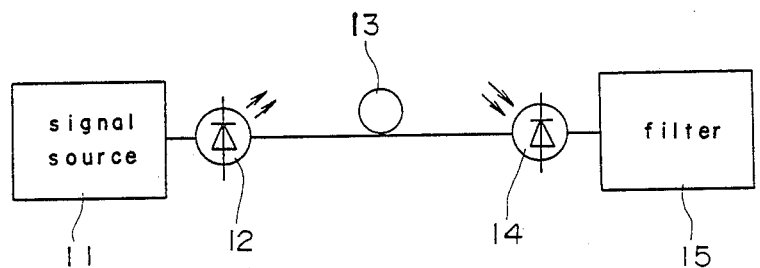
FIG. 2 is a schematic diagram of the prior art.

1;an optical fiber, 2A,2B;support mechanisms, 3A,3B;contact members, 4A,4B;drive mechanisms, 5A,5B;detectors, 11;a signal source, 12;a light source, 13;an optical fiber, 14;a photosensor, 15;a filter.

DESCRIPTION OF A PREFERRED EMBODIMENT

A schematic diagram of an embodiment according to the present invention is shown in FIG. 1.

In FIG. 1, 1 is an optical fiber, 2A and 2B are support mechanisms, 3A and 3B are contact members, 4A and 4B are drive mechanisms and 5A and 5B are detectors. 2A through 5A are components disposed in the near end portion of the optical fiber 1, and 2B through 5B are components disposed in the far end portion of the optical fiber 1.

In the near end portion and the far end portion of the optical fiber 1, the components with the same configuration are disposed which operate in the same manner.

The near end portion of the optical fiber 1 is held with the two support mechanisms 2A.

The contact member 3A has a curved surface, and the drive mechanism 4A drives the contact member 3A back and forth with this curved surface side facing the support mechanism 2A side.

The contact member 3A moving forward toward the support mechanism 2A side contacts the optical fiber 1 supported by the support mechanism 2A, and applies a bending to the optical fiber 1.

The detector 5A is disposed near the optical fiber 1 with the contact member 3A applying a bending to the optical fiber 1.

The contact member 3A moving backward from the support member 2A side removes the bending applied to the optical fiber 1.

The speed of the moving back and forth of the contact member 3A by the drive mechanism 4A is arranged to be around 20 times per second.

When the curved surface of the contact member 3A pushes the optical fiber 1, a bending is applied to the optical fiber 1 such that a part of the optical signals proceeding within the optical fiber 1 comes out of the optical fiber 1. Thus, an amplitude modulation can be applied to the optical signals by applying and removing an attenuation to the optical signals proceeding within the optical fiber 1 in accordance with applying and removing a bending.

When the drive mechanism 4A drives the contact member 3A back and forth for applying a modulation to the optical signals proceeding within the near end side of the optical fiber 1, the drive mechanism 4B keeps applying a bending to the optical fiber 1 at the far end side of the optical fiber 1, and the detector 5B is disposed near the portion in which the bending is applied.

Thus, the optical signals modulated at the near end side of the optical fiber 1 can be detected at the far end side of the optical fiber 1.

When the drive mechanism 4B drives the contact member 3B back and forth for applying a modulation to the optical signals proceeding within the far end side of the optical fiber 1, the drive michanism 4A keeps applying a bending to the optical fiber 1 at the near end side of the optical fiber 1, and the detector 5A is disposed near the portion in which the bending is applied.

Thus, the optical signals modulated at the far end side of the optical fiber 1 can be detected at the near end side of the optical fiber 1.

That is, with the configuration of FIG. 1, it is possible to modulate the optical signals proceeding within the optical fiber 1 at the near end side of the optical fiber 1 and to detect the modulated signals at the far end side of the optical fiber 1, and at the same time, it is also possible to modulate the optical signals proceeding within the optical fiber 1 at the far end side of the optical fiber 1 and to detect the modulated signals at the near end side of the optical fiber 1.

EFFECT OF THE INVENTION

According to the present invention, it is possible to modulate the optical signals proceeding within the optical fiber or to detect the modulated optical signals alternately from the near end side and the far end side of the optical fiber, and to collate the cores of the optical fiber no matter whereto is the direction of the flowing of the optical signals, since the optical signals proceeding within the optical fiber are modulated by the mechanical means at the near end side and far end side of the optical fiber, and at the same time the detectors are disposed near the portions in which the bending is applied with keeping applying the bending to the optical fiber.

It is also possible to collate the cores for the optical fiber in the course of communication with the condition that the bending loss produced when the optical fiber is bent by the contact member and the drive mechanism is suppressed within a limit of not influencing the communication.

We claim:

1. An optical fiber core collator comprising:
    a first pair of support members supporting a near end portion of said optical fiber at two locations;
    a first drive mechanism which drives a contact member having a curved surface toward and away from said support members to contact said curved surface with said optical fiber, thereby applying a bending to and removing the applied bending from said optical fiber;
    a first detector disposed in such a position that said optical fiber is brought into contact with or close proximity to said first detector when said first contact member applies a bending to said optical fiber;
    a second pair of support members supporting a far end portion of said optical fiber at two locations;
    a second drive mechanism which drives a second contact member having a curved surface toward and away from said second pair of the support members to contact said curved surface with said optical fiber, thereby applying a bending to and removing the applied bending from said optical fiber;
    a second detector disposed in such a position that said optical fiber is brought into contact with or close proximity to said second detector when said second contact member applies a bending to said optical fiber;
    one of said drive mechanisms being so arranged to maintain the bending applied to the optical fiber so as to keep the optical fiber in contact with or close proximity to one of said detectors when the other drive mechanism drives back and forth one of the contact members.

2. An optical fiber core collator according to claim 1 wherein
    said first drive mechanism is arranged to maintain the bending applied to the optical fiber so as to keep the optical fiber in contact with or close proximity to the first detector when the second drive mechanism drives back and forth the second contact member;
    and said second drive mechanism keeps the bending applied to the optical fiber so as to keep the optical fiber in contact with or close proximity to the second detector when the first drive mechanism drives back and forth the first contact member.

* * * * *